United States Patent [19]

Fukumoto et al.

[11] Patent Number: 5,231,063
[45] Date of Patent: Jul. 27, 1993

[54] COMPOSITE ADSORBENT AND PROCESS FOR PRODUCING SAME

[75] Inventors: Kazuhiro Fukumoto; Masahiro Sugiura, both of Aichi, Japan

[73] Assignee: Kabushiki Kaisha Toyota Chuo Kenkyusho, Aichi, Japan

[21] Appl. No.: 683,317

[22] Filed: Apr. 10, 1991

[30] Foreign Application Priority Data

Apr. 16, 1990 [JP] Japan ................................. 2-100128

[51] Int. Cl.$^5$ ..................... B01J 29/04; B01J 20/12; B01J 20/20; B01J 20/22
[52] U.S. Cl. ........................................ 502/62; 55/70; 55/73; 55/74; 252/190; 252/193; 423/226; 423/230; 423/239; 423/245.1; 502/401; 502/417
[58] Field of Search ................ 55/387, 524, 526, 527; 131/331, 297, 342; 428/240, 244; 502/401, 62, 417; 252/190

[56] References Cited

U.S. PATENT DOCUMENTS

| 2,115,973 | 5/1938 | Fleming | 502/401 |
| 3,681,450 | 8/1972 | Carboni et al. | 562/862 |
| 4,443,354 | 4/1984 | Eian | 252/190 |

FOREIGN PATENT DOCUMENTS 60-129054  7/1985  Japan.

Primary Examiner—Paul E. Konopka
Attorney, Agent, or Firm—Oblon, Spivak, McClelland, Maier & Neustadt

[57] ABSTRACT

A composite adsorbent comprising an acid salt of an m- or p-aromatic amino acid and an acid. The adsorbent may further contain a transition metal compound. The former removes aldehydes, ammonias and amines simultaneously, and the latter further removes hydrogen sulfide.

The composite adsorbent is used in the form of a powder, a solution, or a solid supported on a carrier.

14 Claims, No Drawings

COMPOSITE ADSORBENT AND PROCESS FOR PRODUCING SAME

BACKGROUND OF THE INVENTION

1. Field of the Invention

The present invention relates to a composite adsorbent which effectively removes various offensive odors of amines, aldehydes, sulfides, etc. originating for industrial and automotive exhaust gas, and other smells of tobacco, human body, human waste, foods, etc. encountered in daily life.

2. Description of the Related Art

Human activities in living rooms, offices, kitchens, automobiles, etc. accompany various offensive odors. It is said that offensive odors in a car contain thousands of components originating from cigarette smoke, sweat, exhaust gas, dust, etc. The Offensive Odor Control Law (Japanese law) describes the following twelve components as important, namely, ammonia, methyl mercaptan, hydrogen sulfide, methyl sulfide, methyl disulfide, trimethylamine, acetaldehyde, styrene, n-butyric acid, n-, iso-valeric acid, and propionic acid.

The conventional methods of removing such offensive odors are by masking with an aromatic or by adsorption with activated carbon or silica gel. However, these methods have disadvantages. Masking with an aromatic does not remove the components of offensive odors in itself, and there may be an instance where the aromatic itself smells unpleasant. As to activated carbon and silica gel, they limit their adsorbate. For example, activated carbon is not effective at all for odors originating from such basic substances as ammonia and trimethylamine.

Another method is chemical removing. It removes offensive odors by the chemical reaction like an acid-base neutralization reaction. It permits the sure removal of both acid odors of acetaldehyde, hydrogen sulfide, etc. and basic odors of ammonia, trimethylamine, etc. More precisely, acid odors and basic odors are removed by neutralization with a basic adsorbent and an acid adsorbent, respectively. However, this chemical adsorbent has also a disadvantage that the basic adsorbent and the acid adsorbent react with each other and become deactivated when they are supported on the same carrier or dispersed in the same liquid simultaneously. This makes it necessary to use separate carriers for the basic and acid adsorbents. As the result, the net amount of each ingredient that can be supported on carriers is reduced and hence the resulting composite adsorbent decreases in deodorizing capacity.

SUMMARY OF THE INVENTION

It is an object of the present invention to provide a new composite adsorbent which effectively and simultaneously adsorbs acid gases such as lower aldehyde and basic gases such as ammonia.

It is another object of the present invention to provide a new composite adsorbent which is composed of two chemically different adsorbents (one being a reductant such as amino acid and the other being an oxidant such as transition metal salt) supported together on the same carrier. The composite adsorbent is as effective in deodorizing performance as a single adsorbent in itself, because coexistence of different adsorbents prevents any decrease in effectiveness caused by separate supporting.

The present inventors carried out a series of researches to eliminate the disadvantages involved in the related art technology and to develop a new composite adsorbent which can effectively and simultaneously remove an offensive odor composed of many smelling components, and they completed the present invention which is embodied in a composite adsorbent.

According to the first aspect of the present invention, the composite adsorbent comprises at least one acid salt selected from the group consisting of acid salts of a m-aromatic amino acid and a p-aromatic amino acid, and at least one acid. It is noticeable that an acid salt of m- or p-a romatic amino acid effectively removes an offensive odor of lower aldehyde (which is acidic ) although it is an acid substance. This is, presumably, because lower aldehydes are adsorbed and deactivated by the cooperative and synergistic chemical reaction of the acidified amino group forming an acid salt with the carboxylic group in the amino acid. The acid coexisting with an acid salt of an amino acid functions to remove basic gases such as ammonia and trimethylamine through the well-known acid-base reaction.

The composite adsorbent of the present invention is highly effective in removing offensive odors originating from acid gases such as lower aldehydes and offensive odors originating from basic gases such as ammonia and trimethylamine. Therefore, it is very useful for the offensive odors containing many smelling components which are present in the living environment such as automobiles, kitchens, living rooms, and offices.

According to the second aspect of the present invention, the composite adsorbent comprises at least one acid salt selected from the group consisting of acid salts of a m-aromatic amino acid and a p-aromatic amino acid, at least one acid, and at least one transition metal compound. The additional transition metal compound effectively removes offensive odors originating from sulfides such as hydrogen sulfide and methyl mercaptan. This effect stems from the ability of the transition metal compound to react with sulfide gases to form metal sulfides.

Usually, a transition metal compound cannot coexist stably with an aromatic amino acid because of the acid-base reaction that takes place between the amino group in the amino acid and the transition metal compound. However, this is not true of an aromatic amino acid in the form of acid salt.

In this case, the amino group forming a salt with the acid added in an excess amount does not react with the transition metal compound. In other words, the second aspect of the present invention was realized by the addition of an excess acid which permits not only the removal of offensive odors originating from basic gases but also the coexistence of an aromatic amino acid with a transition metal compound.

According to the second aspect of the present invention, the three active ingredients can be uniformly supported together and highly dispersed on a porous carrier because they are not reactive with one another. Therefore, the composite adsorbent is highly effective in removing offensive odors originating from many gases of different nature such as ammonia, hydrogen sulfide, and acetaldehyde. It is very useful for the offensive odors containing many smelling components which are present in the living environment such as automobiles, kitchens, living rooms, and offices.

These and other objects of the present invention will become more apparent in the detailed description and examples which follow.

DESCRIPTION OF THE PREFERRED EMBODIMENTS

According to the first aspect of the present invention, the composite adsorbent comprises at least one acid salt selected from the group consisting of acid salts of a m-aromatic amino acid and a p-aromatic amino acid, and at least one acid. The former component is prepared by mixing said acid with said amino acid or a salt of said amino acid. The acid donates a proton to the amino group of the m- or p-aromatic amino acid, thereby changing the aromatic amino acid into an acid salt. If the acid is added in an excess amount, the resulting product is a mixture of an acid salt of m- or p-aromatic amino acid and an acid. As the aromatic amino acid, an aromatic monoamino-monocarboxylic acid can be employed, and especially a m- or p-aminobenzoic acid or p-aminosalicylic acid are preferable.

The acid includes inorganic acids (such as hydrochloric acid, nitric acid, sulfuric acid, phosphoric acid, and pyrophosphoric acid) and organic acids (such as citric acid, malonic acid, malic acid, and oxalic acid). If the composite adsorbent is intended for use at high temperatures, the acid should preferably be a non-volatile one such as sulfuric acid, phosphoric acid, and oxalic acid.

According to the second aspect of the present invention, the composite adsorbent comprises at least one acid salt selected from the group consisting of acid salts of a m-aromatic amino acid and p-aromatic amino acid, at least one acid, and at least one transition metal compound. Examples of the third component include nitrate, sulfate, carbonate, phosphate, pyrophosphate, chloride, bromide, and fluoride of arsenic, mercury, copper, antimony, bismuth, tin, cadmium, lead, zinc, cobalt, nickel, iron, and manganese, the most desirable of which are chloride, bromide, and fluoride of copper, zinc, cobalt, and nickel.

There are no restrictions on the usage of the composite adsorbents pertaining to the first and second aspects of the present invention. They may be used as such in powder form. For a better effect, they may be used in the form of solution in an adequate concentration or in the form of solid supported on a porous carrier. Examples of the porous carrier include inorganic porous carriers (such as sepiolite, palygorskite, activated carbon, zeolite, activated carbon fiber, activated alumina, sepiolite-mixed paper, silica gel, activated clay, vermiculite, and diatomaceous earth), and organic porous carriers (such as pulp, fibers, cloth, and polymeric cellular body), the most desirable of which are sepiolite, palygorskite, activated carbon, activated alumina, and zeolite.

The porous carrier supports the active ingredients of the composite adsorbent in its pores uniformly, so that the active ingredients have an enlarged area that comes into contact with the gases of offensive odor and hence adsorb them efficiently. In addition, the porous carrier itself has the capability for adsorption and hence enhances the performance of the composite adsorbent. For example, activated carbon and sepiolite are effective respectively in adsorption of offensive odors originating from hydrocarbon gases and lower fatty acids. The porous carrier may be in the form of sheet, honeycomb, powder, pellet, granule, plate, fiber, etc.

There are no restrictions on the method by which the composite adsorbent is supported on the above-mentioned porous carrier. Supporting may be accomplished by mixing the composite adsorbent with the porous carrier, both in the form of fine particles. Alternatively, supporting should preferably be accomplished by impregnating the porous carrier with a solution of the composite adsorbent in water (or any other adequate solvent). The latter method is effective in the uniform dispersion of the active ingredients on the porous carrier, which leads to the maximum deodorizing performance.

According to the present invention, it is desirable that the active ingredients of the composite adsorbent should be supported in an amount of 0.1–30 wt% of the porous carrier. With an amount less than 0.1 wt%, the active ingredients of the composite adsorbent are not enough to produce a good deodorizing effect. With an amount in excess of 30 wt%, the active ingredients of the composite adsorbent are not uniformly dispersed on the porous carrier, with the result that the composite adsorbent does not fully exhibit its deodorizing performance and the porous carrier itself decreases in the gas adsorbing capacity. A preferred amount ranges from 0.5 to 15 wt%.

It is necessary that the ratio of the active ingredients and the kind of the porous carrier should be properly selected according to the major constituent gases of the offensive odor to be removed.

Having generally described this invention, a further understanding can be obtained by reference to specific examples which are provided herein for purposes of illustration only and are not intended to be limiting unless otherwise specified.

EXAMPLE 1

An aqueous solution containing an acid salt of an aromatic amino acid and an acid was prepared by dissolving an aromatic amino acid and an acid according to the formulation for Sample No. 1 as shown in Table 1. In the preparation of the aqueous solution, the acid was added in an excess amount so that the amino group in the aromatic amino acid is supplied with a proton for the formation of ammonium ion.

TABLE 1

| | Composition of Composite Adsorbent | | | |
|---|---|---|---|---|
| Sample No. | Amino acid (g) | Acid (g) | Transition metal Compound (g) | Water (g) |
| 1 | p-aminobenzoic acid (12) | 85% phosphoric acid (18) | — | 200 |
| 2 | p-aminobenzoic acid (12) | 85% phosphoric acid (18) | Cupric chloride dihydrate (12) | 200 |
| 3 | p-aminobenzoic acid (12) | 96% sulfuric acid (20.2) | Cupric chloride dihydrate (12) | 200 |
| 4 | m-aminobenzoic acid (12) | 36% hydrochloric acid (17.8) | Cupric chloride dihydrate (12) | 200 |
| 5 | p-aminosalicylic | Oxalic acid (14.1) | Cupric chloride | 200 |

TABLE 1-continued

| | Composition of Composite Adsorbent | | | |
|---|---|---|---|---|
| Sample No. | Amino acid (g) | Acid (g) | Transition metal Compound (g) | Water (g) |
| 6 | acid (12) p-aminobenzoic acid (12) | 85% phosphoric acid (18) | dihydrate (12) Nickel chloride hexahydrate (12) | 200 |
| C-1 | — | — | Cupric chloride dihydrate (12) | 200 |
| C-2 | o-aminobenzoic acid (12) | — | — | 200 |

The aqueous solution was impregnated into 300 g of activated carbon (4–6 mesh) obtained from coconut shell. After drying at 100° C. for 10 hours, there was obtained a composite adsorbent (sample No. 1).

The thus obtained composite adsorbent was tested for adsorptivity for acetaldehyde, ammonia, and hydrogen sulfide in the following manner. One gram of the composite adsorbent was placed in a 5-liter impermeable bag. Into this bag were introduced 425 ppm of acetaldehyde, 900 ppm of ammonia, and 10000 ppm of hydrogen sulfide. The bag was left sealed at room temperature for 24 hours. The concentration of the gases remaining in the bag was measured, and it was translated into the removal ratio ( % ) according to the formula below.

$$\text{Removal ratio (\%)} = \frac{A - B}{A} \times 100$$

where
A: blank concentration
B: residual concentration
("Blank concentration" denotes the concentrations of the gases remaining in the bag containing no adsorbent after a prescribed period of time. The blank concentrations of acetaldehyde, ammonia, and hydrogen sulfide are 401.1 ppm, 820 ppm, and 7200 ppm, respectively.)

The determination of acetaldehyde was by gas chromatography under the conditions shown in Table 2, and the determination of ammonia and hydrogen sulfide was by a gas detecting tube. The results of the determinations are shown in Table 3 (Sample No. 1).

For comparison, the same experiment as mentioned above was carried out using cupric chloride alone or o-aminobenzoic acid alone supported on the carrier. The results are shown in Table 3 (Sample Nos. C-1 and C-2).

It is noted from Table 3 that the composite adsorbent in Example 1 is by far superior in adsorptivity of both acetaldehyde and ammonia to the comparative samples.

TABLE 2

| Column | FAL-M 10%, Shimalite TPA glass, 3 m × 3 mm dia. |
|---|---|
| Column temperature | 75° C. |
| Carrier gas | Nitrogen, 30 ml/min |
| Detector | FID |
| Apparatus | GC-15A, Shimdadzu Seisakusho Ltd. |

TABLE 3

| Smelling gas | Sample No. | Residual concentration (ppm) | Removal ratio (%) |
|---|---|---|---|
| Acetaldehyde | 1 | 2.0 | 99 |
| | 2 | 2.1 | 99 |
| | 3 | not detected | 100 |
| | 4 | 24.8 | 93 |
| | 5 | 40.0 | 90 |
| | 6 | not detected | 100 |
| | C-1 | 320.6 | 20 |
| | C-2 | 63.6 | 84 |
| Ammonia | 1 | 7.3 | 99 |
| | 2 | 7.5 | 99 |
| | 3 | 0.4 | 99 |
| | 4 | 2.7 | 99 |
| | 5 | 98.0 | 88 |
| | 6 | 20.0 | 97 |
| | C-1 | 85.9 | 89 |
| | C-2 | 666.2 | 18 |
| Hydrogen sulfide | 1 | 5215.7 | 27 |
| | 2 | 750.0 | 85 |
| | 3 | 2.0 | 99 |
| | 4 | not detected | 100 |
| | 5 | 1.7 | 99 |
| | 6 | 5200.0 | 27 |
| | C-1 | not detected | 100 |
| | C-2 | 260.0 | 96 |

EXAMPLE 2

Aqueous solutions each containing an acid salt of an aromatic amino acid, an acid, and a transition metal compound were prepared by dissolving an aromatic amino acid, an acid, and a transition metal compound according to the formulation for Sample Nos. 2-6 as shown in Table 1. In the preparation of the aqueous solutions, the acid was added in an excess amount so that the amino group in the aromatic amino acid is supplied with a proton for the formation of ammonium ion.

Each of the aqueous solutions was impregnated into 300 g of activated carbon (4–6 mesh) obtained from coconut shell. After drying at 100° C. for 10 hours, there were obtained composite adsorbents (sample Nos. 2-6).

The thus obtained composite adsorbents were tested for adsorptivity for acetaldehyde, ammonia, and hydrogen sulfide in the same manner as in Example 1. The results are shown in Table 3 ( Sample Nos. 2-6). It is noted from Table 3 that the composite adsorbents in Example 2 are by far superior in adsorptivity of all of acetaldehyde, ammonia and hydrogen sulfide to the comparative samples.

What is claimed is:

1. A composite adsorbent for removing offensive odors from a gas comprising as active ingredients at least one acid salt selected from the group consisting of acid salts of a m-aromatic amino acid and a p-aromatic amino acid, and at least one acid and at least one transition metal compound.

2. A composite adsorbent as claimed in claim 1, wherein the aromatic amino acid is an aromatic monoamino-monocarboxylic acid.

3. A composite adsorbent as claimed in claim 2, wherein the aromatic monoamino-monocarboxylic acid is one selected from the group consisting of a m-aminobenzoic acid, a p-aminobenzoic acid and a p-aminosalicylic acid.

4. A composite adsorbent as claimed in claim 1, wherein the acid is an inorganic acid.

5. A composite adsorbent as claimed in claim 4, wherein the inorganic acid is a member selected from the group consisting of a hydrochloric acid, a nitric acid, a sulfuric acid, a phosphoric acid, and a pyrophosphoric acid.

6. A composite adsorbent as claimed in claim 1, wherein the acid is an organic acid.

7. A composite adsorbent as claimed in claim 6, wherein the organic acid is a member selected from the group consisting of a citric acid, a malonic acid, a malic acid, and an oxalic acid.

8. A composite adsorbent as claimed in claim 1, wherein the transition metal compound is a member selected from the group consisting of salts of arsenic, mercury, copper, antimony, bismuth, tin, cadmium, lead, zinc, cobalt, nickel, iron and manganese.

9. A composite adsorbent as claimed in claim 1, wherein the transition metal compound is a member selected from the group consisting of a nitrate, a sulfate, a carbonate, a phosphate, a pyrophosphate, a chloride, a bromide, and a fluoride.

10. A composite adsorbent as claimed in claim 1, wherein the active ingredients are supported uniformly on a porous carrier.

11. A composite adsorbent as claimed in claim 10, wherein the porous carrier is a member selected from the group consisting of inorganic porous carriers of sepiolite, palygorskite, activated carbon, zeolite, activated carbon fiber, activated alumina, sepiolite-mixed paper, silica gel, activated clay, vermiculite, and diatomaceous earth, and organic porous carriers of pulp, fibers, cloth, and a polymeric cellular body.

12. A composite adsorbent as claimed in claim 10, wherein the active ingredients are supported on the porous carrier in the amount of 0.1-30 wt% of the porous carrier.

13. A composite adsorbent as claimed in claim 1, wherein the active ingredients are supported uniformly on a porous carrier.

14. A composite adsorbent as claimed in claim 13, wherein the active ingredients are supported on the porous carrier in the amount of 0.1-30 wt% of the porous carrier.

* * * * *